US011953858B2

(12) United States Patent
Nakazawa et al.

(10) Patent No.: US 11,953,858 B2
(45) Date of Patent: Apr. 9, 2024

(54) WATCH

(71) Applicant: Seiko Epson Corporation, Toyko (JP)

(72) Inventors: Toshinori Nakazawa, Matsumoto (JP); Tetsuya Miyake, Matsumoto (JP); Atsushi Kobayashi, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/153,031

(22) Filed: Jan. 20, 2021

(65) Prior Publication Data

US 2021/0223744 A1 Jul. 22, 2021

(30) Foreign Application Priority Data

Jan. 21, 2020 (JP) ................................. 2020-007408

(51) Int. Cl.
*G02B 19/00* (2006.01)
*G04B 19/30* (2006.01)
*G04B 19/32* (2006.01)

(52) U.S. Cl.
CPC ........... *G04B 19/32* (2013.01); *G04B 19/305* (2013.01)

(58) Field of Classification Search
CPC ....... G04B 19/32; G04B 19/305; G01D 13/28
See application file for complete search history.

(56) References Cited

U.S. PATENT DOCUMENTS 4,236,240 A 11/1980 Yoshida
5,519,671 A 5/1996 Murakami et al.
5,838,644 A * 11/1998 Yoneda .................. G04B 19/32 368/239
5,984,485 A 11/1999 Poli et al.
6,821,014 B2 11/2004 Hiranuma et al.
7,242,639 B2 7/2007 Blondeau et al.
7,623,415 B2 11/2009 Raeber et al.
7,889,602 B2 2/2011 Behling et al.
2003/0016315 A1 1/2003 Ueno et al.
2003/0123332 A1 7/2003 Hiranuma et al.
2003/0174585 A1 9/2003 Igarashi et al.
2004/0047242 A1 3/2004 Germiquet et al.
2004/0125585 A1 7/2004 Sung
2007/0025186 A1 2/2007 Gilomen
2007/0068245 A1 3/2007 Blondeau et al.
2007/0183264 A1 8/2007 Raeber et al.
2009/0015514 A1 1/2009 Suzuki et al.
2009/0154296 A1 6/2009 Behling et al.
2009/0185451 A1 7/2009 Rochat
(Continued)

FOREIGN PATENT DOCUMENTS

CN 1190201 A 8/1998
EP 860755 A1 * 8/1998 ............. G04B 19/30
(Continued)

*Primary Examiner* — Julie A Bannan
(74) *Attorney, Agent, or Firm* — Harness, Dickey & Pierce, P.L.C.

(57) ABSTRACT

A watch includes crystal, a dial including a marking, a pointer including a luminous body, and a light-transmissive member disposed between the crystal and the dial, the light-transmissive member including a first face facing the crystal and a second face facing the dial, in which the first face is provided with a first luminous member and a second luminous member, and the second face is provided with a third luminous member and a fourth luminous member.

17 Claims, 8 Drawing Sheets

(56) References Cited

U.S. PATENT DOCUMENTS

| | | | |
|---|---|---|---|
| 2009/0185452 | A1 | 7/2009 | Veuthey et al. |
| 2013/0051192 | A1 | 2/2013 | Oshio |
| 2018/0081406 | A1 | 3/2018 | Kita et al. |
| 2021/0131638 | A1 | 5/2021 | Sato et al. |
| 2022/0107074 | A1 | 4/2022 | Sato et al. |

FOREIGN PATENT DOCUMENTS

| | | | | |
|---|---|---|---|---|
| EP | 1870786 | A1 * | 12/2007 | ............. G04B 19/32 |
| EP | 1870786 | A1 | 12/2007 | |
| GB | 2280049 | A | 1/1995 | |
| JP | H06-186355 | A | 7/1994 | |
| JP | H07-020266 | A | 1/1995 | |
| JP | H07-77585 | A | 3/1995 | |
| JP | H07-218656 | A | 8/1995 | |
| JP | 2000-111661 | A | 4/2000 | |
| JP | 2002-012190 | A | 1/2002 | |
| JP | 2002-181960 | A | 6/2002 | |
| JP | 3329817 | B2 | 9/2002 | |
| JP | 2003-194968 | A | 7/2003 | |
| JP | 2004-101525 | A | 4/2004 | |
| JP | 2006-275948 | A | 10/2006 | |
| JP | 2007-286075 | A | 11/2007 | |
| JP | 2009-156868 | A | 7/2009 | |
| JP | 3203279 | U | 3/2016 | |
| JP | 2016-170399 | A | 9/2016 | |
| WO | 2006-103965 | A1 | 10/2006 | |
| WO | 2018-021456 | A1 | 2/2018 | |
| WO | 2019-245030 | A1 | 12/2019 | |
| WO | WO-2019245030 | A1 * | 12/2019 | .............. F21S 43/14 |

* cited by examiner

WATCH

The present application is based on, and claims priority from JP Application Serial Number 2020-007408, filed Jan. 21, 2020, the disclosure of which is hereby incorporated by reference herein in its entirety.

BACKGROUND

1. Technical Field

The present disclosure relates to a watch.

2. Related Art

There is disclosed in JP 2002-181960 A, a diving watch used during diving by a diver who dives in the sea or the like. According to this, a dial is provided with markings indicating the clock times from 1 o'clock to 12 o'clock. Luminescent paint as a luminous body is applied to these markings, and pointers. The luminescent paint is deemed to be sufficient to ensure the visibility in a dark place.

Unfortunately, only the luminescent paint that is applied to the dial or the pointer, like that described in JP 2002-181960 A, is actually insufficient to display information other than the clock time in an easy-to-understand manner to a user. For example, in deep darkness where only the luminous body is visually recognizable, it is difficult to perceive the orientation of the watch and read the information, and moreover, a multifunctional wristwatch such as a diving watch has much information that should be displayed to the user, such as a water depth and a duration time of diving. Accordingly, the present disclosure aims to provide a watch having a marking configuration that is easily recognizable for the user.

SUMMARY

A watch includes a crystal, a dial including a marking, a pointer including a luminous body, and a light-transmissive member disposed between the crystal and the dial, the light-transmissive member including a first face facing the crystal and a second face facing the dial, in which the first face is provided with a first luminous body, and the second face is provided with a second luminous body.

DESCRIPTION OF EXEMPLARY EMBODIMENTS

First Embodiment

Figure 1:
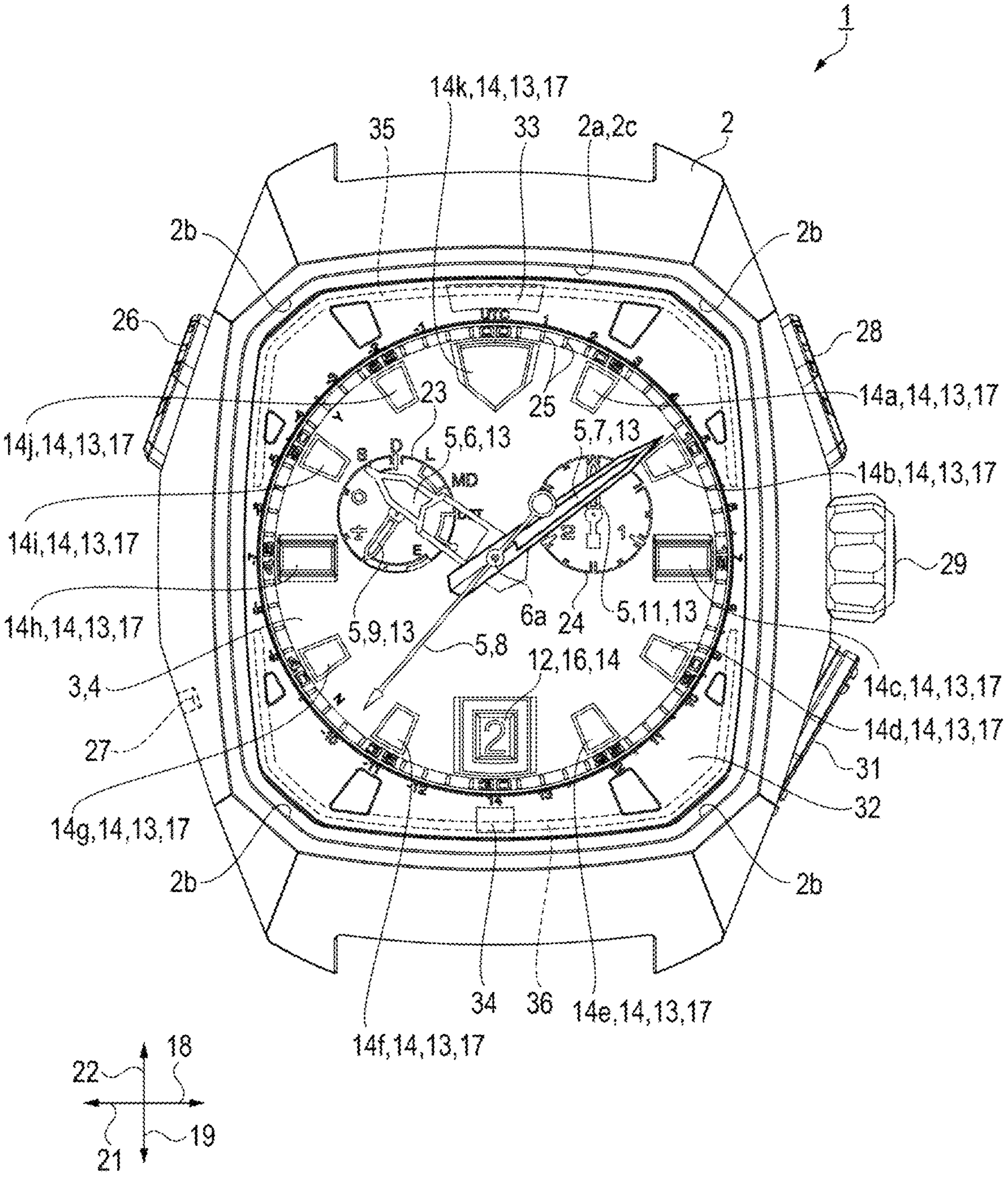
FIG. 1 is a front elevational view illustrating a watch according to a first embodiment.

As illustrated in FIG. 1, a watch 1 is a divers quartz watch that is worn on a wrist of a user. The divers quartz watch is one type of a diving watch. The watch 1 includes an outer case 2 as a case, and a crystal 3. A dial 4, a movement, and a pointer 5 are stored inside the outer case 2. The pointer 5 is driven by the movement. The pointer 5 includes an hour hand 6, a minute hand 7, a seconds hand 8, a first sub-hand 9, and a second sub-hand 11. Moreover, a date indicator 12 for indicating day is provided inside the outer case 2. The hour hand 6, the minute hand 7, the first sub-hand 9, and the second sub-hand 11 include a luminous body 13. The luminous bodies 13 include a fluorescent body and a luminous body, and is formed by applying fluorescent paint or the like.

The outer case 2 includes an opening 2*a*. The crystal 3 is disposed in the opening 2*a* of the outer case 2. The hour hand 6, the minute hand 7, and the seconds hand 8 indicate the clock time. The dial 4 includes markings 14 that indicate the clock time. The markings 14 include symbols, graphics, numbers, and characters that are related to the clock time, and are scales of the hour hand 6, the minute hand 7, and the seconds hand 8 in the first embodiment. The markings 14 are arranged, in a clockwise direction, in a circumferential direction from a marking 14*a* of 1 o'clock to a marking 14*k* of 12 o'clock. Each of the markings 14 includes a third luminous body 17 that is the luminous body 13. Thus, the markings 14 on the dial 4 have the third luminous body 17 that is the luminous body 13.

A date window 16 as a marking of 6 o'clock configured to display the date indicator 12 is disposed between the marking 14*e* of 5 o'clock and the marking 14*f* of 7 o'clock. The date window 16 serves as the marking 14 indicating 6 o'clock.

A direction from a shaft 6*a* of the hour hand 6 toward the marking 14*c* of 3 o'clock is designated as a 3 o'clock direction 18, when viewed in plan view from the normal direction of the dial 4. A direction opposite to the 3 o'clock direction 18 is designated as a 9 o'clock direction 21. A direction facing the marking 14*k* of 12 o'clock with respect to the shaft 6*a* of the hour hand 6 is designated as a 12 o'clock direction 22. A direction opposite to the 12 o'clock direction 22 is designated as a 6 o'clock direction 19.

The opening 2*a* of the outer case 2 forms a polygonal shape. Specifically, the opening 2*a* of the outer case 2 has a shape that corner portions 2*b* of an inner wall 2*c* of a quadrangular case are chamfered. The sides of the opening 2*a* of the outer case 2 in the 3 o'clock direction 18, the 6 o'clock direction 19, the 9 o'clock direction 21, and the 12 o'clock direction 22 correspond to polygonal sides and forms a gentle curve. The opening 2*a* of the outer case 2, which has a shape with multiple corners, enhances the diversity of a shape of the opening 2*a* of the outer case 2 compared to a quadrangular shape. Note that the polygonal sides may be straight lines.

The hour hand 6, the minute hand 7, and the seconds hand 8 are the pointers 5 at the center, which are each attached to three pieces of pointer shafts provided through the dial 4 at the planar center position of the dial 4. The shaft 6*a* is one of the pointer shafts. The first sub-hand 9 is provided at a first sub dial 23 provided in a 10 o'clock direction with respect to the shaft 6*a*. The 10 o'clock direction coincides with a direction from the shaft 6*a* toward the marking 14*i* of 10 o'clock. The second sub-hand 11 is provided at a second sub dial 24 provided in a direction from the shaft 6*a* toward the marking 14*b* of 2 o'clock. An outer circumference of the dial 4 is provided with minute scales 25 arranged in 60 equal divisional parts. Note that the minute scales 25 may be provided on the dial, or may be provided on a panel cover disposed in a manner encircling the dial.

An outer circumference of the first sub dial 23 is provided with a battery remaining amount gauge and a mark indicating an operation mode at a current point of time. The first sub-hand 9 indicates a battery remaining amount. The first sub-hand 9 also indicates types of the operation mode. As such, the first sub-hand 9 and the first sub dial 23 function as a mode display configured to display the operation mode of the watch 1. Note that the watch 1 has the operation modes, such as dive modes including a diving mode and a snorkeling mode, a time reception mode for adjusting the clock time using satellite signals, standard radio waves, wireless communication, and the like, and an airplane mode for restricting communication functions.

The second sub dial 24 displays the marking 14 configured to indicate the numbers of rotations of the hour hand 6 and the minute hand 7. The second sub dial 24 is used when the hour hand 6 and the minute hand 7 indicate a water depth or a duration time of diving. The second sub dial 24 can also be used as a timer function. In the first embodiment, the second sub dial 24 can be used as a three-minute timer that makes one round in three minutes.

A side face of the outer case 2 is provided with a first button 26 and a water detection sensor 27. The first button 26 serves as an element of an operation device for instructing switching of the modes. The water detection sensor 27 is a sensor that is configured to detect that the watch 1 has entered into water or that the watch 1 has been pulled out from water.

The side face of the outer case 2 is provided with a second button 28, a crown 29, and a pressure sensor 31. The second button 28 serves as an element of an operation device for starting and stopping a timer function of the second sub dial 24. The crown 29 serves as an element of an operation device for adjusting positions of the hour hand 6, the minute hand 7, and the date indicator 12. The pressure sensor 31 is configured to measure a pressure exerted on the watch 1.

Figure 2:
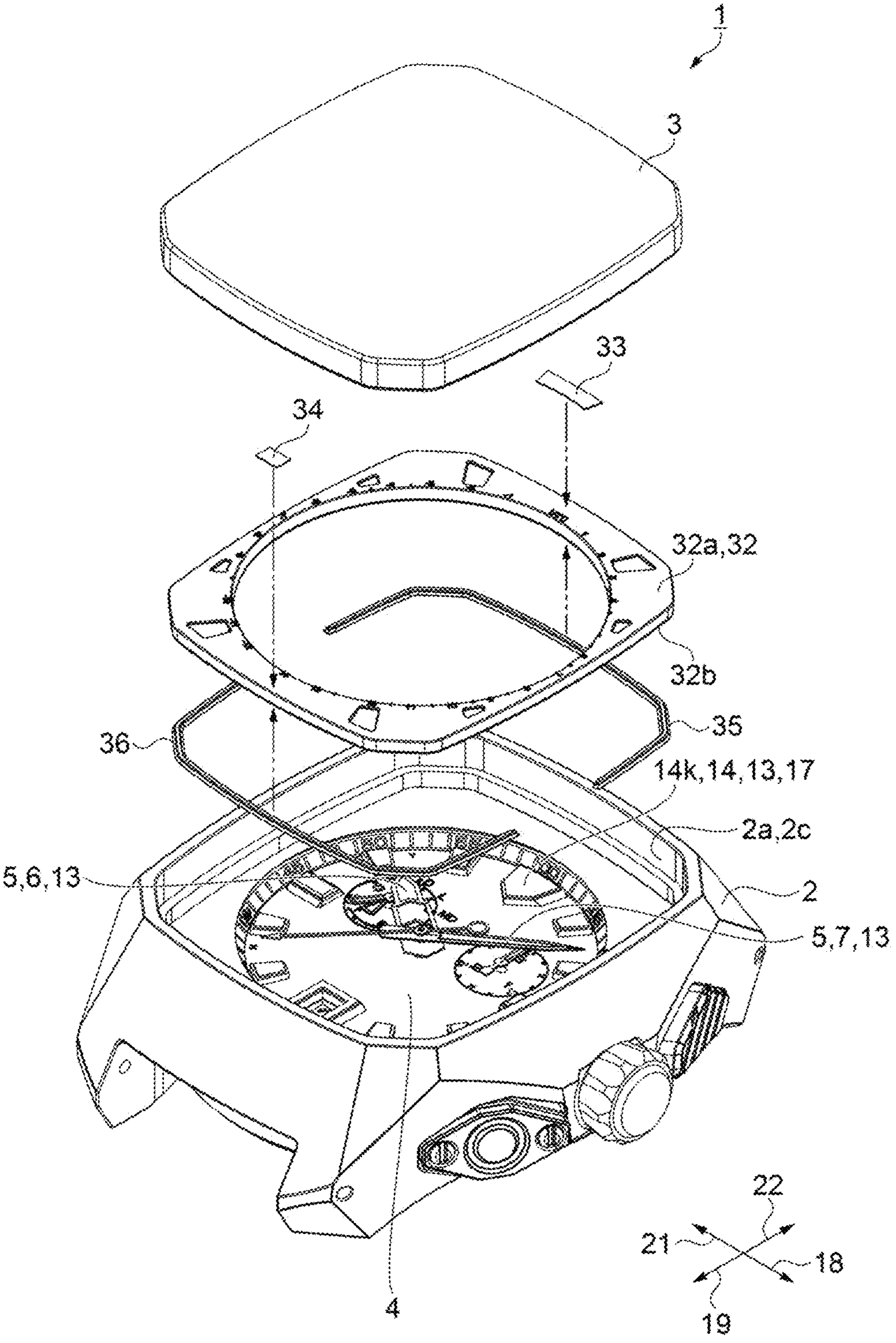
FIG. 2 is an exploded perspective view illustrating a structure of a watch.

As illustrated in FIG. 2, a light-transmissive member 32 is disposed between the dial 4 and the crystal 3. The light-transmissive member 32 is stored inside the outer case 2. The light-transmissive member 32 includes a first face 32*a* facing the crystal 3 and a second face 32*b* facing the dial 4. The first face 32*a* of the light-transmissive member 32 is provided with a first luminous member 33 as a luminous body and a first luminous body, and a second luminous member 34 as the luminous body and a first luminous body. The second face 32*b* of the light-transmissive member 32 is provided with a third luminous member 35 as the luminous body and a second luminous body and a fourth luminous member 36 as the luminous body and a second luminous body.

The first luminous member 33 and the second luminous member 34 are viewed at the front side, and the dial 4 is viewed at the back side. Further, the third luminous member 35 and the fourth luminous member 36 are viewed between the first luminous member 33 and the second luminous member 34, and the dial 4. The arrangement as such of the first luminous member 33, the second luminous member 34, the third luminous member 35, the fourth luminous member 36, and the dial 4, makes a display surface of the watch 1 three-dimensional. The marks on the first luminous member 33, the second luminous member 34, the third luminous member 35, the fourth luminous member 36, and the dial 4, which make the display surface of the watch 1 three-dimensional, allow information content of visual depth to increase, improving the distinguishability. This makes it possible to provide the watch 1 having a marking configuration that is easily recognizable for the user. The marking 14 can be made easily recognizable compared to a watch in which the luminescent paint is selectively applied to the dial 4 and the pointer 5.

The first luminous member 33 and the second luminous member 34 are arranged between the third luminous body 17 and the outer case 2, when viewed in plan view from the normal direction of the dial 4. A face of the outer case 2 facing a side face of the light-transmissive member 32 is designated as the inner wall 2*c* of the case.

The third luminous body 17 is disposed at the dial 4. The first luminous member 33 and the second luminous member 34 are viewed in a manner not overlapping with the third luminous body 17, when viewed in plan view from the normal direction of the dial 4. This allows the user to visually recognize each of colors and shapes of the first luminous member 33 and the second luminous member 34, and a color and shape of the third luminous body 17. The user, who can distinguish each of the first luminous member 33 and the second luminous member 34, and the third luminous body 17, recognizes each of positions of the first luminous member 33 and the second luminous member 34, and the third luminous body 17.

The first luminous member 33 is disposed on a side of the 12 o'clock direction 22 of the marking 14*k* of 12 o'clock. That is, the first luminous member 33 is provided at a 12 o'clock position. The second luminous member 34 is disposed on a side of the 6 o'clock direction 19 of the date window 16. The third luminous body 17 provided at the 12 o'clock position has the same color as the first luminous member 33. In the first embodiment, the colors of the first luminous member 33, the second luminous member 34, and the third luminous body 17 are set to blue color, for example. The first luminous member 33 and one of the third luminous bodies 17 are both provided at the 12 o'clock position with respect to the shaft 6*a* of the hour hand 6. This makes it possible to accentuate the 12 o'clock position compared to when only the third luminous body 17 is disposed and the first luminous member 33 is not disposed. This makes the 12 o'clock position easily perceivable.

A plurality of the first luminous bodies are arranged at the first face 32*a* of the light-transmissive member 32. The first luminous body represents the first luminous member 33 and the second luminous member 34. The arrangement of the plurality of the first luminous bodies enhances the diversity of locations where the first luminous bodies are arranged.

The second luminous member 34 is provided at a position of the date window 16 corresponding to the marking of 6 o'clock. The first luminous member 33 is provided at a position of the marking 14*k* of 12 o'clock. The first luminous member 33 located at the position of the marking 14*k* of 12 o'clock is greater in size than the second luminous member 34 located at the position of the marking of 6 o'clock. Thus, the marking 14*k* of 12 o'clock is more conspicuous than the date window 16 corresponding to the marking of 6 o'clock, which makes the user easily recognize the orientation of the watch 1.

The third luminous member 35 and the fourth luminous member 36 are arranged along the inner wall 2*c* of the case. The third luminous member 35 is disposed in the 12 o'clock direction 22 of the dial 4. The fourth luminous member 36 is disposed on a side of the 6 o'clock direction 19 of the dial 4. The user, by viewing the third luminous member 35 and the fourth luminous member 36 that have shapes along the inner wall 2*c* of the case, easily perceives the position, size, and orientation of the outer case 2.

The third luminous member 35 and the fourth luminous member 36 are arranged at the corner portions 2*b* of the inner wall 2*c* of the case. In the first embodiment, the third luminous member 35 and the fourth luminous member 36 are partially arranged at the corner portions 2*b* of the inner wall 2*c* of the case. The third luminous member 35 and the fourth luminous member 36 may be wholly arranged at the corner portions 2*b* of the inner wall 2*c* of the case. This makes positions of the corner portions 2*b* of the inner wall 2*c* of the case easily recognizable. This makes the orientation of the watch 1 easily perceivable. The third luminous member 35 and the fourth luminous member 36, which are arranged at the corner, can be arranged so as not to interfere with the layout of other components.

At the light-transmissive member 32, a plurality of the second luminous bodies that are intended for the third luminous member 35 and the fourth luminous member 36 are arranged. The arrangement of the plurality of the second luminous bodies enhances the diversity of locations where the second luminous bodies are arranged.

The user can confirm, through the crystal 3, the dial 4, the first luminous member 33, the second luminous member 34, the third luminous member 35, the fourth luminous member 36, and the luminous bodies 13 on the pointers 5. The user confirms the positions of the hour hand 6 and the minute hand 7 by the luminous bodies 13 on the hour hand 6 and the minute hand 7. This makes it possible to confirm, even in water in darkness, the position of the hour hand 6 and the minute hand 7.

Second Embodiment

Figure 3:
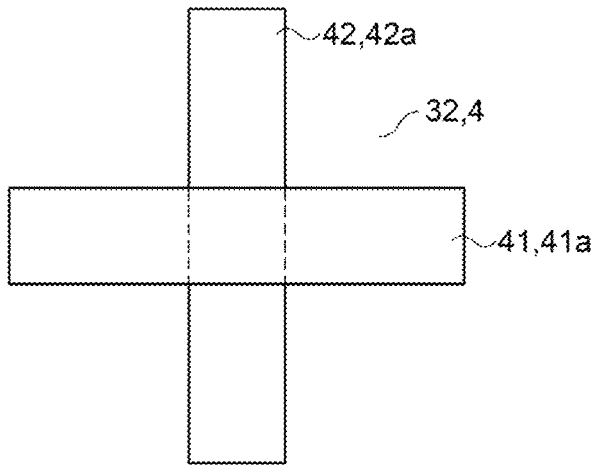
FIG. 3 is an explanatory view schematically illustrating an arrangement of a first luminous body and a second luminous body according to a second embodiment.

In the second embodiment, an example of a combination of the first luminous body and the second luminous body is described. As illustrated in FIG. 3, a first luminous body 41 overlaps a second luminous body 42, when viewed in plan view from the normal direction of the dial 4. The first luminous body 41 forms a shape of a first straight line 41*a*, and the second luminous body 42 forms a shape of a second straight line 42*a*. The first straight line 41*a* intersects the second straight line 42*a*. The first straight line 41*a* is formed at the first face 32*a* of the light-transmissive member 32. The second straight line 42*a* is formed at the second face 32*b* of the light-transmissive member 32. The first straight line 41*a* and the second straight line 42*a* are formed at different faces. This allows the first straight line 41*a* and the second straight line 42*a* to be arranged such that an angle formed by an intersection of a contour of the first straight line 41*a* and a contour of the second straight line 42*a* does not form an arc. The contours of the first straight line 41*a* and the second straight line 42*a* becomes clear, improving the visibility.

The first luminous body 41 may have the same color as the second luminous body 42. The first luminous body 41 has the same color as the second luminous body 42, which makes a graphic constituted by the first luminous body 41 and the second luminous body 42 achieve a sense of unity.

The first luminous body 41 may have a different color from the second luminous body 42. The first luminous body 41 has a different color from the second luminous body 42, which increases a width of a degree of freedom of impression that is given from the graphic constituted by the first luminous body 41 and the second luminous body 42. This increases a freedom of design.

Third Embodiment

Figure 4:
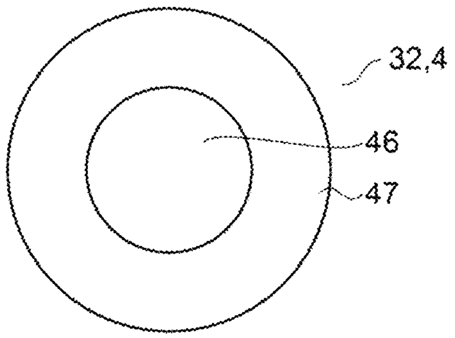
FIG. 4 is an explanatory plan view schematically illustrating an arrangement of a first luminous body and a second luminous body according to a third embodiment.
Figure 5:
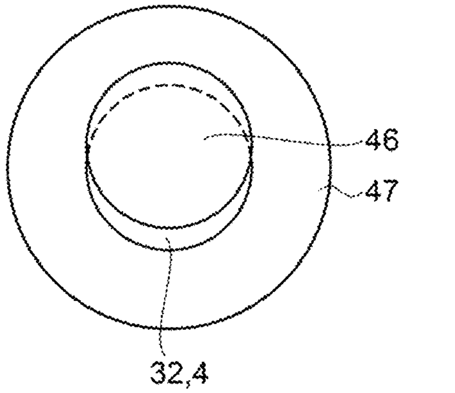
FIG. 5 is an explanatory perspective view schematically illustrating an arrangement of a first luminous body and a second luminous body.

In the third embodiment, an example of a combination of the first luminous body and the second luminous body is described. As illustrated in FIG. 4, a first luminous body 46 is in contact with a second luminous body 47, when viewed in plan view from the normal direction of the dial 4. The contour of the first luminous body 46 coincides with the contour of the second luminous body 47, when viewed in plan view from the normal direction of the dial 4. As illustrated in FIG. 5, the contour of the first luminous body 46 appears to be separated from the contour of the second luminous body 47, when viewed from a direction oblique to the normal direction of the dial 4. This allows the user to determine whether viewing the dial 4 from the normal direction of the dial 4 or from an oblique angle with respect to the dial 4.

A misalignment occurs between a tip end of the minute hand 7 and the minute scales 25, when the dial 4 is viewed from the oblique angle with respect to the dial 4. The user misreads the minute scale 25 next to the minute scale 25 pointed by the minute hand 7 as the minute scale 25 pointed by the minute hand 7. The user, by confirming the first luminous body 46 and the second luminous body 47, can be prevented from erroneously reading the minute scales 25.

Fourth Embodiment

Figure 6:
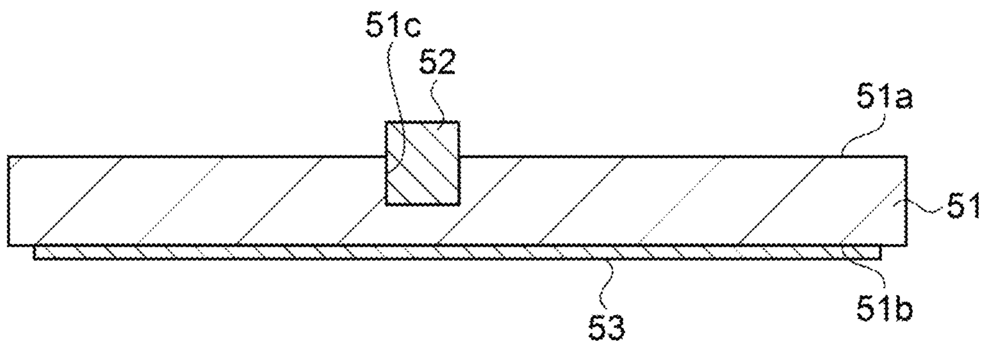
FIG. 6 is a side sectional view schematically illustrating a structure of a light-transmissive member according to a fourth embodiment.

As illustrated in FIG. 6, a light-transmissive member 51 is provided, at a first face 51*a*, with a first luminous member 52 as the luminous body and the first luminous body, and is provided, at a second face 51*b*, with a third luminous member 53 as the luminous body and the second luminous body. The first face 51*a* faces the crystal 3. The second face 51*b* faces the dial 4. The light-transmissive member 51, the first luminous member 52, and the third luminous member 53 correspond to the light-transmissive member 32, the first luminous member 33, and the third luminous member 35 in the first embodiment, respectively.

A concave portion 51*c* is formed at the first face 51*a*, and the first luminous member 52 is disposed at the concave portion 51*c*. The first luminous member 52 is thicker in thickness than the third luminous member 53. The first luminous member 52 and the third luminous member 53 that have a thicker thickness emit more intense light than these members that have a thinner thickness. Thus, the first luminous member 52 emit more intense light than the third luminous member 53. The first luminous member 52 that emits more intense light can be displayed more emphatically than the third luminous member 53. This makes a position of the first luminous member 52 more strongly assertive.

Fifth Embodiment

Figure 7:
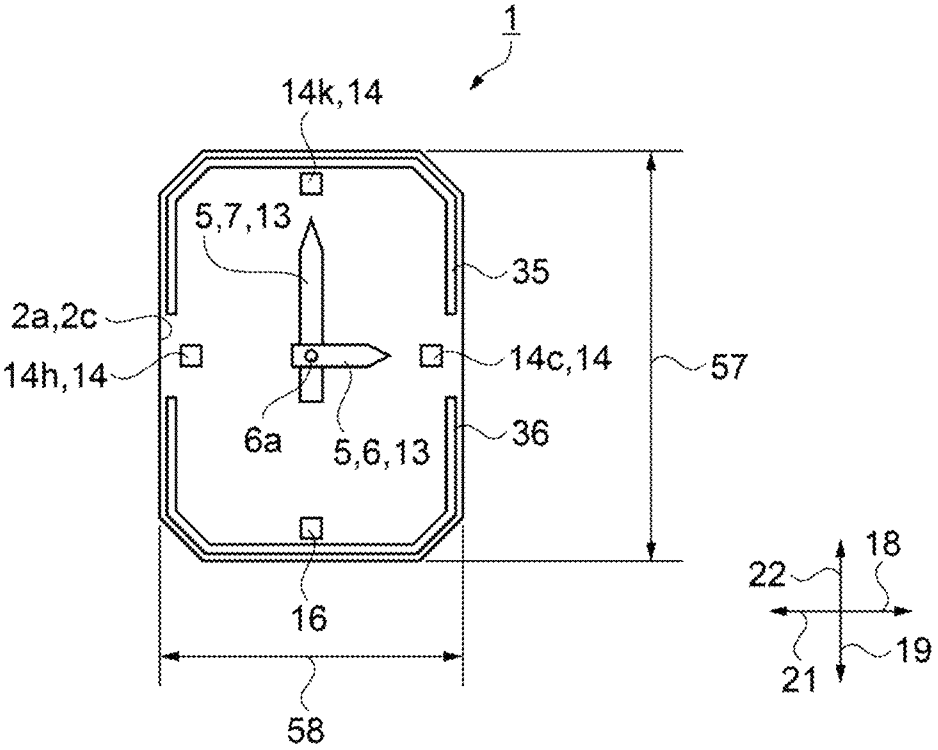
FIG. 7 is an explanatory plan view schematically illustrating an arrangement of a third luminous member and a fourth luminous member according to a fifth embodiment.

As illustrated in FIG. 7, a length in the 12 o'clock direction 22 and the 6 o'clock direction 19 of the outer case 2 is designated as a first length 57. A length in the 3 o'clock direction 18 and the 9 o'clock direction 21 is designated as a second length 58. The first length 57 is longer than the second length 58.

Figure 8:
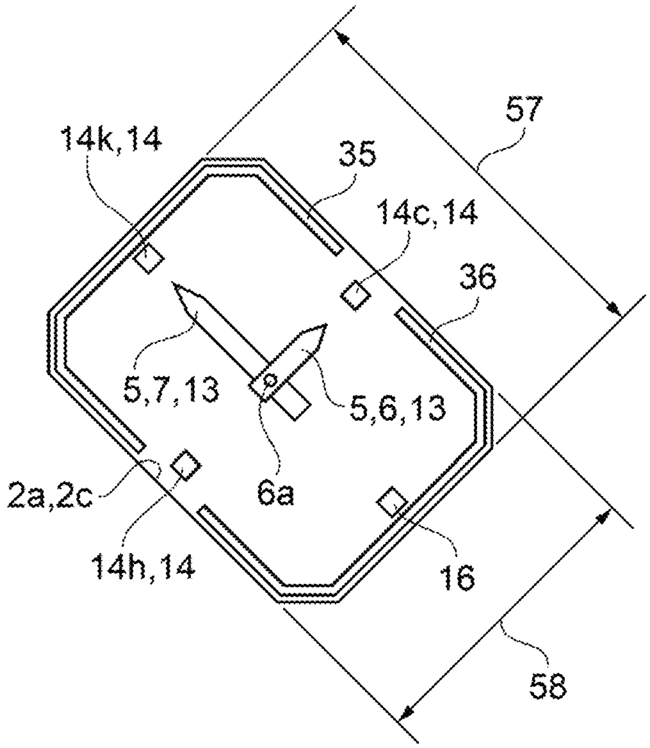
FIG. 8 is an explanatory plan view schematically illustrating an arrangement of a third luminous member and a fourth luminous member.

As illustrated in FIG. 8, even when the opening 2*a* of the outer case 2 rotates about the shaft 6*a*, the opening 2*a* of the outer case 2 has a longer length in a direction passing through the date window 16 and the marking 14*k* of 12 o'clock, and has a shorter length in a direction passing through the marking 14*c* of 3 o'clock and the marking 14*h* of 9 o'clock. The third luminous member 35 and the fourth luminous member 36, which are arranged along the inner wall 2*c* of the case, allow the user to recognize the shape of the opening 2*a* of the outer case 2 even in a dark environment. This allows the user viewing the opening 2*a* of the outer case 2 to easily recognizes the orientation of the watch 1.

Sixth Embodiment

Figure 9:
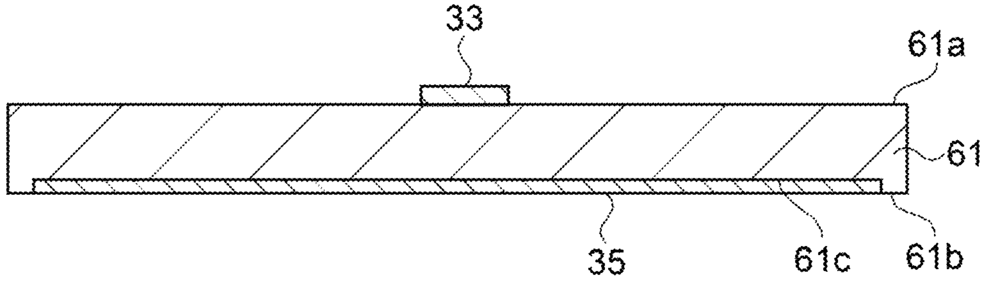
FIG. 9 is an explanatory side sectional view illustrating a structure of a light-transmissive member according to a sixth embodiment.

As illustrated in FIG. 9, a light-transmissive member 61 is provided, at a first face 61*a*, with the first luminous member 33. A second face 61*b* of the light-transmissive member 61 includes a concave portion 61*c* where the third luminous member 35 is disposed. In the light-transmissive member 61, the third luminous member 35 is disposed at the concave portion 61*c*. The light-transmissive member 61 including the third luminous member 35 can be made thinner in thickness than when the third luminous member 35 is disposed on the second face 61*b*, without the concave portion 61*c*, of the light-transmissive member 61.

The light-transmissive member 61 including the third luminous member 35, of which the thickness is made thinner, can shorten a height of the inner wall 2*c* of the case. The inner wall 2*c* of the case, of which the height is made shorter, allows the dial 4 to be easily viewed even from the oblique angle with respect to the normal direction of the dial 4.

Seventh Embodiment

Figure 10:
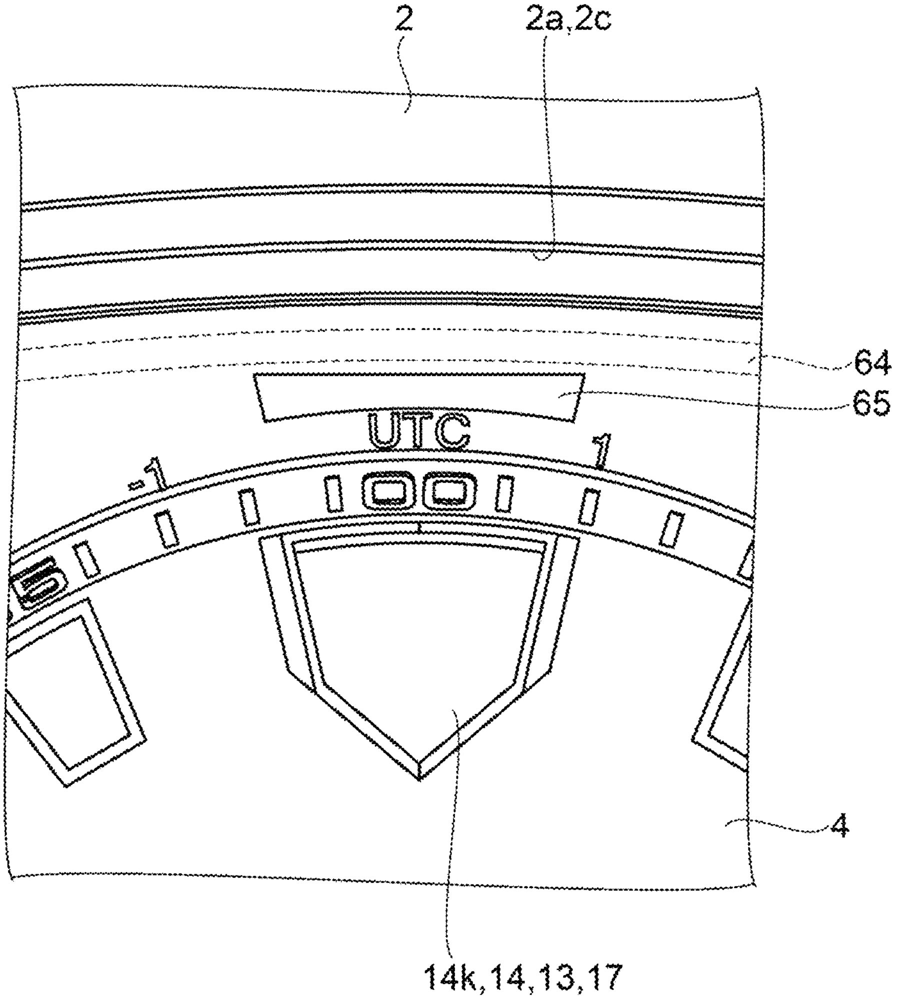
FIG. 10 is an explanatory plan view schematically illustrating an arrangement of markings and a third luminous member according to a seventh embodiment.

As illustrated in FIG. 10, a third luminous member 64 as the luminous body and the second luminous body is disposed between the third luminous body 17 and the outer case 2, when viewed in plan view from the normal direction of the dial 4. A first luminous member 65 is disposed between the third luminous member 64 and the third luminous body 17. The first luminous member 65 and the third luminous member 64 correspond to the first luminous member 33 and the third luminous member 35 in the first embodiment, respectively.

The third luminous member 64 and the third luminous body 17 are viewed in a manner not overlapping each other, when viewed in plan view from the normal direction of the dial 4. This makes each of a color and shape of the third luminous member 64 and the color and shape of the third luminous body 17 viewable. The third luminous member 64 and the third luminous body 17 can be each distinguished.

Eighth Embodiment

Figure 11:
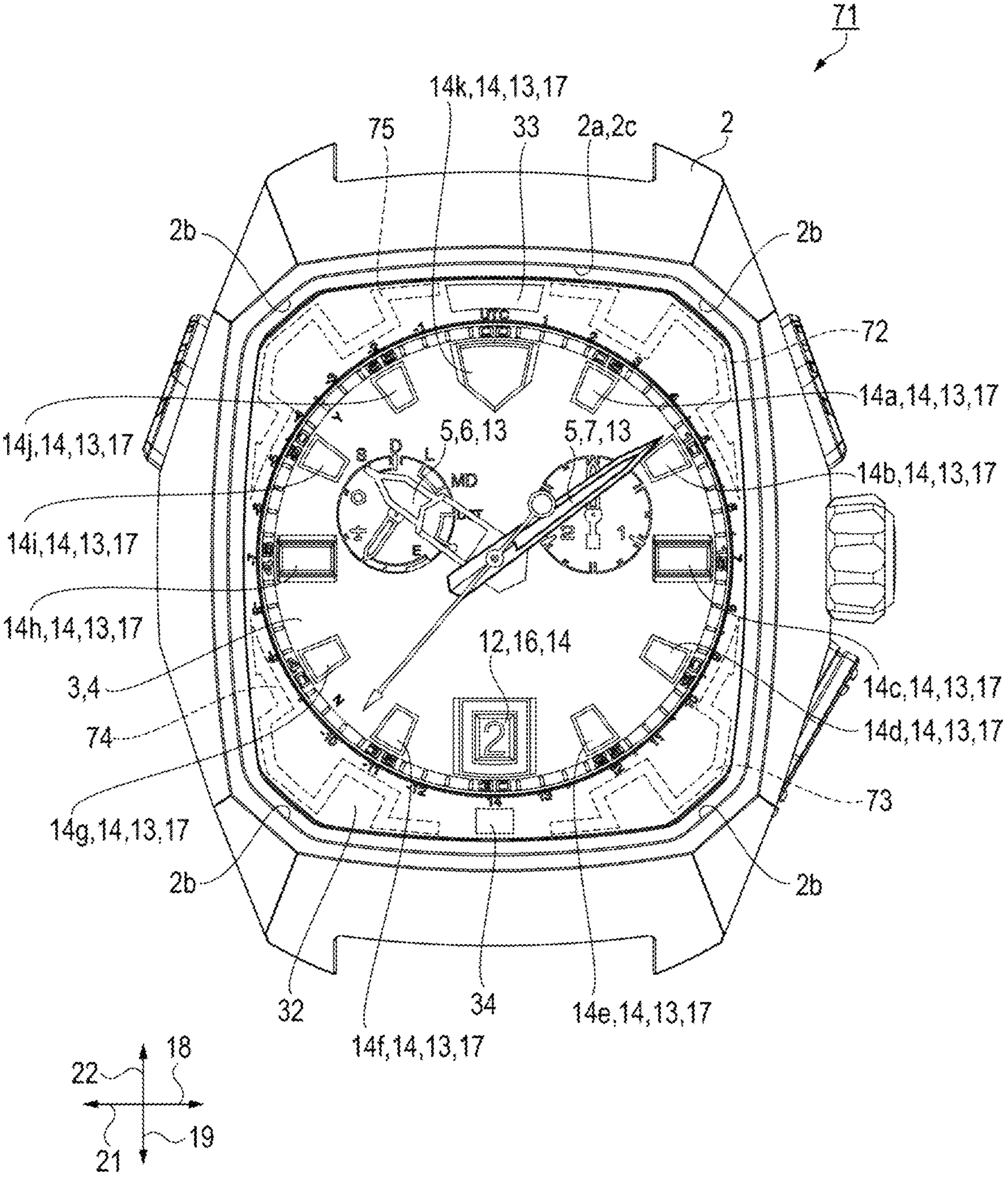
FIG. 11 is a front elevational view illustrating a watch according to an eighth embodiment.

Constituent elements as in the first embodiment are denoted by the same reference signs, and redundant descriptions of such constituent elements will be omitted. As illustrated in FIG. 11, a watch 71 is provided, at the second face 32*b* of the light-transmissive member 32, with a fifth luminous member 72 as the luminous body and the second luminous body, a sixth luminous member 73 as the luminous body and the second luminous body, a seventh luminous member 74 as the luminous body and the second luminous body, and an eighth luminous member 75 as the luminous body and the second luminous body.

The fifth luminous member 72 is provided between the marking 14*a* of 1 o'clock and the marking 14*b* of 2 o'clock, and the inner wall 2*c* of the case. The sixth luminous member 73 is provided between the marking 14*d* of 4 o'clock and the marking 14*e* of 5 o'clock, and the inner wall 2*c* of the case. The seventh luminous member 74 is provided between the marking 14*f* of 7 o'clock and the marking 14*g* of 8 o'clock, and the inner wall 2*c* of the case. The eighth luminous member 75 is provided between the marking 14*i* of 10 o'clock and the marking 14*j* of 11 o'clock, and the inner wall 2*c* of the case.

The fifth luminous member 72 through the eighth luminous member 75 are along the inner wall 2*c* of the case. This makes a position of the inner wall 2*c* of the case easily recognizable.

The fifth luminous member 72 through the eighth luminous member 75 are arranged at the corner portions 2*b* of the inner wall 2*c* of the case. This makes the positions of the corner portions 2*b* of the inner wall 2*c* of the case easily recognizable.

At the light-transmissive member 32, the plurality of the second luminous bodies that are intended for the fifth luminous member 72 through the eighth luminous member 75 are arranged. The arrangement of the plurality of the second luminous bodies enhances the diversity of locations where the second luminous bodies are arranged.

Ninth Embodiment

Figure 12:
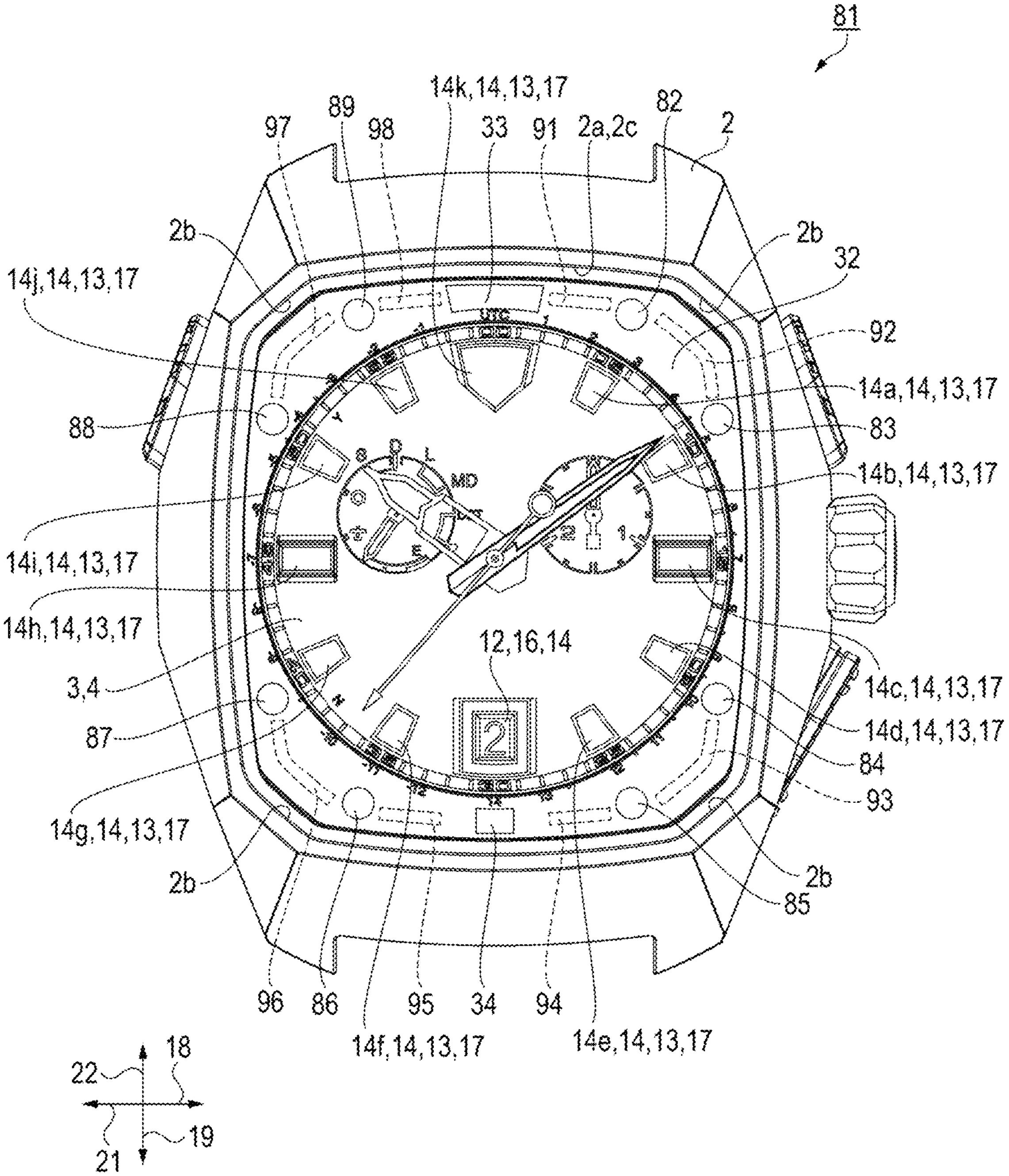
FIG. 12 is a front elevational view illustrating a watch according to a ninth embodiment.

Constituent elements as in the first embodiment are denoted by the same reference signs, and redundant descriptions of such constituent elements will be omitted. As illustrated in FIG. 12, a watch 81 is provided, at the first face 32*a* of the light-transmissive member 32, a ninth luminous member 82 as the luminous body and the first luminous body, through a sixteenth luminous member 89 as the luminous body and the first luminous body. The ninth luminous member 82 is provided between the marking 14*a* of 1 o'clock and the inner wall 2*c* of the case. The tenth luminous member 83 as the luminous body and the first luminous body is provided between the marking 14*b* of 2 o'clock and the inner wall 2*c* of the case. The eleventh luminous member 84 as the luminous body and the first luminous body is provided between the marking 14*d* of 4 o'clock and the inner wall 2*c* of the case. The twelfth luminous member 85 as the luminous body and the first luminous body is provided between the marking 14*e* of 5 o'clock and the inner wall 2*c* of the case. The thirteenth luminous member 86 as the luminous body and the first luminous body is provided between the marking 14*f* of 7 o'clock and the inner wall 2*c* of the case. The fourteenth luminous member 87 as the luminous body and the first luminous body is provided between the marking 14*g* of 8 o'clock and the inner wall 2*c* of the case. The fifteenth luminous member 88 as the luminous body and the first luminous body is provided between the marking 14*i* of 10 o'clock and the inner wall 2*c* of the case. The sixteenth luminous member 89 is provided between the marking 14*j* of 11 o'clock and the inner wall 2*c* of the case.

The watch 81 is provided, at the second face 32*b* of the light-transmissive member 32, with a seventeenth luminous member 91 as the luminous body and the second luminous body, an eighteenth luminous member 92 as the luminous body and the second luminous body, a nineteenth luminous member 93 as the luminous body and the second luminous body, and a twentieth luminous member 94 as the luminous body and the second luminous body. In addition to the above, the watch 81 is provided, at the second face 32*b* of the light-transmissive member 32, with a twenty-first luminous member 95 as the luminous body and the second luminous body, a twenty-second luminous member 96 as the luminous body and the second luminous body, a twenty-third luminous member 97 as the luminous body and the second luminous body, and a twenty-fourth luminous member 98 as the luminous body and the second luminous body.

The seventeenth luminous member 91 is provided between the first luminous member 33 and the ninth luminous member 82. The eighteenth luminous member 92 is provided between the ninth luminous member 82 and the tenth luminous member 83. The nineteenth luminous member 93 is provided between the eleventh luminous member 84 and the twelfth luminous member 85. The twentieth luminous member 94 is provided between the twelfth luminous member 85 and the second luminous member 34. The twenty-first luminous member 95 is provided between the second luminous member 34 and the thirteenth luminous member 86. The twenty-second luminous member 96 is provided between the thirteenth luminous member 86 and the fourteenth luminous member 87. The twenty-third luminous member 97 is provided between the fifteenth luminous member 88 and the sixteenth luminous member 89. The twenty-fourth luminous member 98 is provided between the sixteenth luminous member 89 and the first luminous member 33.

The seventeenth luminous member 91 through the twenty-fourth luminous member 98 are along the inner wall 2*c* of the case. This makes the position of the inner wall 2*c* of the case easily recognizable.

The eighteenth luminous member 92, the nineteenth luminous member 93, the twenty-second luminous member 96, and the twenty-third luminous member 97 are arranged at the corner portions 2*b* of the inner wall 2*c* of the case. This makes the positions of the corner portions 2*b* of the inner wall 2*c* of the case easily recognizable.

At the light-transmissive member 32, the plurality of the second luminous bodies that are intended for the seventeenth luminous member 91 through the twenty-fourth luminous member 98 are arranged. The arrangement of the plurality of the second luminous bodies enhances the diversity of locations where the second luminous bodies are arranged.

Tenth Embodiment

In the first embodiment, the date window 16, which is located at the 6 o'clock position, serves as the marking of 6 o'clock. The date window 16 may be disposed at either one of the 5 o'clock position or the 3 o'clock position, without being limited to the 6 o'clock position. The date window 16 may be provided as a separate configuration from the markings of the clock time.

What is claimed is:

1. A watch, comprising:

a crystal;

a dial including a marking;

a pointer including a luminous body; and a member that is transmissive to light disposed between the crystal and the dial, the member that is transmissive to light including a first face facing the crystal and a second face facing the dial, wherein the first face is provided with a first luminous body, the second face is provided with a second luminous body, and the first and second luminous bodies overlap each other in a plan view; and the first and second luminous bodies are configured to provide the watch with a display surface that appears three-dimensional.

2. The watch according to claim 1, wherein the first luminous body overlaps the second luminous body, when viewed in plan view from a normal direction of the dial.

3. The watch according to claim 1, wherein the first luminous body is in contact with the second luminous body, when viewed in plan view from the normal direction of the dial.

4. The watch according to claim 1, wherein the first luminous body has a same color as the second luminous body.

5. The watch component according to claim 1, wherein the first luminous body has a different color from the second luminous body.

6. The watch according to claim 5, wherein the first luminous body emits more intense light than the second luminous body.

7. The watch according to claim 1, comprising a case that stores the dial, the pointer, and the light-transmissive member, wherein the marking of the dial includes a third luminous body, and the first luminous body is disposed between the third luminous body and the case, when viewed in plan view from a normal direction of the dial.

8. The watch according to claim 7, wherein the second luminous body is disposed between the third luminous body and the case, when viewed in plan view from the normal direction of the dial.

9. The watch according to claim 7, wherein the first luminous body is provided at a 12 o'clock position, and the third luminous body provided at the 12 o'clock position has a same color as the first luminous body.

10. The watch according to claim 7, wherein the second luminous body is disposed along an inner wall of the case.

11. The watch according to claim 10, wherein the second luminous body is disposed at a corner portion of the inner wall of the case.

12. The watch according to claim 10, wherein a length of an opening of the case in a direction passing through the marking of 6 o'clock and the marking of 12 o'clock is longer than a length of the opening of the case in a direction passing through the marking of 3 o'clock and the marking of 9 o'clock.

13. The watch according to claim 12, wherein the opening of the case has a polygonal shape.

14. The watch according to claim 1, wherein a plurality of the first luminous bodies are arranged.

15. The watch according to claim 14, wherein the first luminous body is provided at positions of the marking of 6 o'clock and the marking of 12 o'clock, and the first luminous body located at the position of the marking of 12 o'clock is greater in size than the first luminous body located at the position of the marking of 6 o'clock.

16. The watch according to claim 14, wherein a plurality of the second luminous bodies are arranged.

17. The watch according to claim 1, wherein the second face of the light-transmissive member includes a concave portion, and the second luminous body is disposed at the concave portion.

* * * * *